United States Patent
Munz

[19]

[11] Patent Number: 6,136,353

[45] Date of Patent: Oct. 24, 2000

[54] METHOD OF INCORPORATING FATTY MATTER INTO GRANULATED PRODUCTS

[75] Inventor: Konrad Munz, Neukirch, Switzerland

[73] Assignee: Buhler AG, Uzwil, Switzerland

[21] Appl. No.: 09/147,400

[22] PCT Filed: Jul. 22, 1996

[86] PCT No.: PCT/CH96/00265

§ 371 Date: Dec. 16, 1998

§ 102(e) Date: Dec. 16, 1998

[87] PCT Pub. No.: WO98/03080

PCT Pub. Date: Jan. 29, 1998

[51] Int. Cl.[7] .............................. A23K 1/00; A23N 12/00
[52] U.S. Cl. ..................... 426/281; 426/305; 426/635; 426/805; 99/472; 99/487; 99/516
[58] Field of Search ..................... 426/281, 305, 426/601, 623, 630, 635, 805; 99/472, 487, 516

[56] References Cited

U.S. PATENT DOCUMENTS

| | | | |
|---|---|---|---|
| 3,467,525 | 9/1969 | Hale et al. | 426/305 X |
| 4,393,087 | 7/1983 | Sullins et al. | 426/623 X |
| 4,844,927 | 7/1989 | Morris, III et al. | 426/307 |
| 4,861,606 | 8/1989 | Jensen | 426/305 |
| 4,971,820 | 11/1990 | Likuski et al. | 426/281 |

FOREIGN PATENT DOCUMENTS

| | | |
|---|---|---|
| 2138944 | 5/1990 | Japan . |
| 3180163 | 8/1991 | Japan . |
| 2232573 | 12/1990 | United Kingdom . |
| 2241862 | 9/1991 | United Kingdom . |
| 93/14645 | 8/1993 | WIPO . |

OTHER PUBLICATIONS

Patent Abstracts of Japan, vol. 14, No. 377 (C–0748) Aug. 15, 1990.

Patent Abstracts of Japan, vol. 15, No. 429 (C–0880) Oct. 31, 1991.

*Primary Examiner*—Milton Cano
*Attorney, Agent, or Firm*—Greenblum & Bernstein, P.L.C.

[57] ABSTRACT

A method and apparatus for incorporating fatty matter into granulated feed products such as extrudates, pellets and expander pellets with a fat-supplying liquid. Pellets produced in the extruder or expander of press (4) are dried in a dryer (5) and pass through an intermediate container (10) into a mixer (12). Using a metering pump (18) a predetermined amount of fat-supplying liquid is added to the mixer (12) and spread on the surface of product pieces through the mixing process. After a predetermined period of time a vacuum pump (20) generates a negative pressure in the mixer so as to evacuate the air from capillaries or pores of the product pieces. The negative pressure in the mixer is then relieve through an expansion valve (21) so that the air entering into the mixer and into the pores or capillaries of the product pieces transports the fat-supplying liquid on the surface of the product pieces as well as additional fat-supplying liquid into the pores and capillaries, thereby filling them to the extend that a high proportion of approximately 30% fat-supplying liquid is incorporated in the pores of capillaries of the product pieces.

16 Claims, 1 Drawing Sheet

METHOD OF INCORPORATING FATTY MATTER INTO GRANULATED PRODUCTS

This application is 371 of PCT/CH96/00265 filed on Jul. 22, 1996.

BACKGROUND OF THE INVENTION

1. Field of the Invention

The present invention relates to a process for applying fat to a granulated product which includes combining in a container a predetermined quantity of the granulated product with a predetermined quantity of a fat-containing liquid to moisten the granulated product, generating a predetermined negative pressure in the container of the moistened granulated product, and releasing the negative pressure over a predetermined duration while mixing the moistened granulated product. The present invention also relates to a device for applying fat to a granulated product by combining in a container the granulated product with a fat-containing liquid to moisten the granulated product; generating a predetermined negative pressure in the container of the moistened granulated product; and releasing the negative pressure over a predetermined duration while mixing the moistened granulated product.

2. Discussion of Background Information

Throughout this document the term "applying fat", being the opposite of the term "removing fat", is used analogously to "applying moisture" and the opposite, "removing moisture". In the case of applying moisture, a liquid is brought into contact with a product in such a way that the liquid does not just penetrate the surface but also the interior of the product. Conversely, in the case of removing moisture, the liquid is not just removed from the surface of the product but also withdrawn from the interior, thus drying the product.

In the same sense, in the case of applying fat, a product is brought together with a fat-containing liquid, in such a way that the fat-containing liquid not only remains on the surface but also penetrates into the interior.

There is a problem when granulated food products, i.e. product elements such as extruded products, pellets, expander pellets etc. with a high fat-content, are produced. This is noted with fish food which is intended to float on the surface of the water. If the addition of fat takes place prior to the cooking process or forming process, then the mechanical cohesion properties of the finished product are poor, resulting in a poor consistency of the formed product element.

If on the other hand, the fat is applied after the forming process by spray drums or mixers in the conventional way, then there is a problem in that only the surface of the product to which fat is to be applied, absorbs the fat-containing liquid, or that the fat-containing liquid penetrates the product only slowly by capillary action. In the case of increased viscosity or closed or small pores, this process takes place even more slowly.

For the above-mentioned reasons, the quantity of fat which can be applied to the product by spray drums or mixers, must be limited to between 5 and 10% of the granulate quantity.

The Japanese patent application with publication number HEI3-180 163 (1991) shows and describes an improved system where a product is admitted, by a dosing lock, to an upward-pointing feed screw. An oil pump with a predetermined level is maintained in the lower part of the inclined feed screw, into which said sump the product falls and is moistened during the upward transport. In addition, a vacuum pump ensures that there is negative pressure in the feed screw. In other words, during upward transport, the product transported upward after exposure to the fat-containing liquid is subjected to a predefined negative pressure.

In this system, the level of the oil sump can be set and varied.

According to details provided, the aforementioned rate of oil absorption of between 5 and 10% of the granulate quantity is improved to 13.5% of the granulate quantity in the above-mentioned system.

However, practical application shows that still higher fat absorption is desired. It is thus the object of the invention to increase such absorption, of the fat-containing liquid, in the granulated product. This is particularly desirable for fish food. According to the invention, this object is met by the combination of features disclosed herein.

Fish food formulations which usually contain a considerable portion of fish meal are gently extruded in an extruder at temperatures around 120° C. with a water content of 20 to 30%. With optimal extrusion conditions, this plastic material expands in the extruder at temperatures exceeding 100° C. as a result of the associated steam pressure. Subsequently, on leaving the extruder, the material solidifies to a bread-like, foamy structure, i.e., the moisture is removed, and after experiencing the associated cooling, the solidified product is cooled.

SUMMARY OF THE INVENTION

According to the invention, such a dried product is placed into a mixer on a weighing cell, preferably a paddle mixer, so that based on the measured product weight, the required quantity of fat-containing liquid can be added. This pre-set quantity of fat-containing liquid is added while the mixer is turning so as to wet the surfaces of the product components. In this process negative pressure is maintained in the mixer, in a similar manner as the previously mentioned prior art, resulting in evacuation of the air from the capillaries of the product.

At this stage it is advantageous if the product components are at a preset temperature corresponding to low viscosity of the fat-containing liquid, so as to ensure good penetration into the capillaries or pores of the product in the step of the invention which will be explained in detail below. In this step, where subsequent to the creation of negative pressure and simultaneous application of fat to the product, the negative pressure is released in the mixer containing the product so that the atmospheric air again enters the mixer and conveys the fat-containing liquid into the evacuated pores or capillaries of the product.

Due to the conveying of the fat-containing liquid from the surface into the pores, it is possible for the product to absorb up to 30% or more of the fat-containing liquid.

When less than 10% of the fat-containing liquid below 10%, which is also is to be added to a product, such as a very porous product component, this can be carried out advantageously carried out by spraying the fat-containing liquid in the mixer so as to achieve even surface wetting.

When more than 15% of the fat-containing liquid is to be added to granulate or when the granulate is in the form of compact product components, spraying can not be done. The fat-containing liquid can be absorbed by the product, i.e. by the product components during the mixing process, partly from the bottom of the mixer.

It is advantageous that the product or product components to which fat is to be applied, are at a temperature of approx. 40° C. The product or product components are conveyed to a cooler or to a ventilated storage cell.

As already mentioned, the process according to the invention has the advantage that substantially more fat per quantity of granulate is bound to the product, as compared to the prior art where only the wetted product is subjected to negative pressure, without release of the negative pressure taking place while mixing. In the inventive process, the negative pressure is released while mixing and this causes the fat-containing liquid to be better absorbed by the pores or capillaries.

This process has the advantage of causing the absorption of the fat particles in the pores and the associated binding of product components and fat, i.e. absorption into the pores instead of lying on the surface of the granulate.

BRIEF DESCRIPTION OF THE DRAWING

Below, the invention is illustrated and described by a FIGURE showing merely one embodiment.

The FIGURE schematically shows equipment with the device according to the invention.

Figure 1:
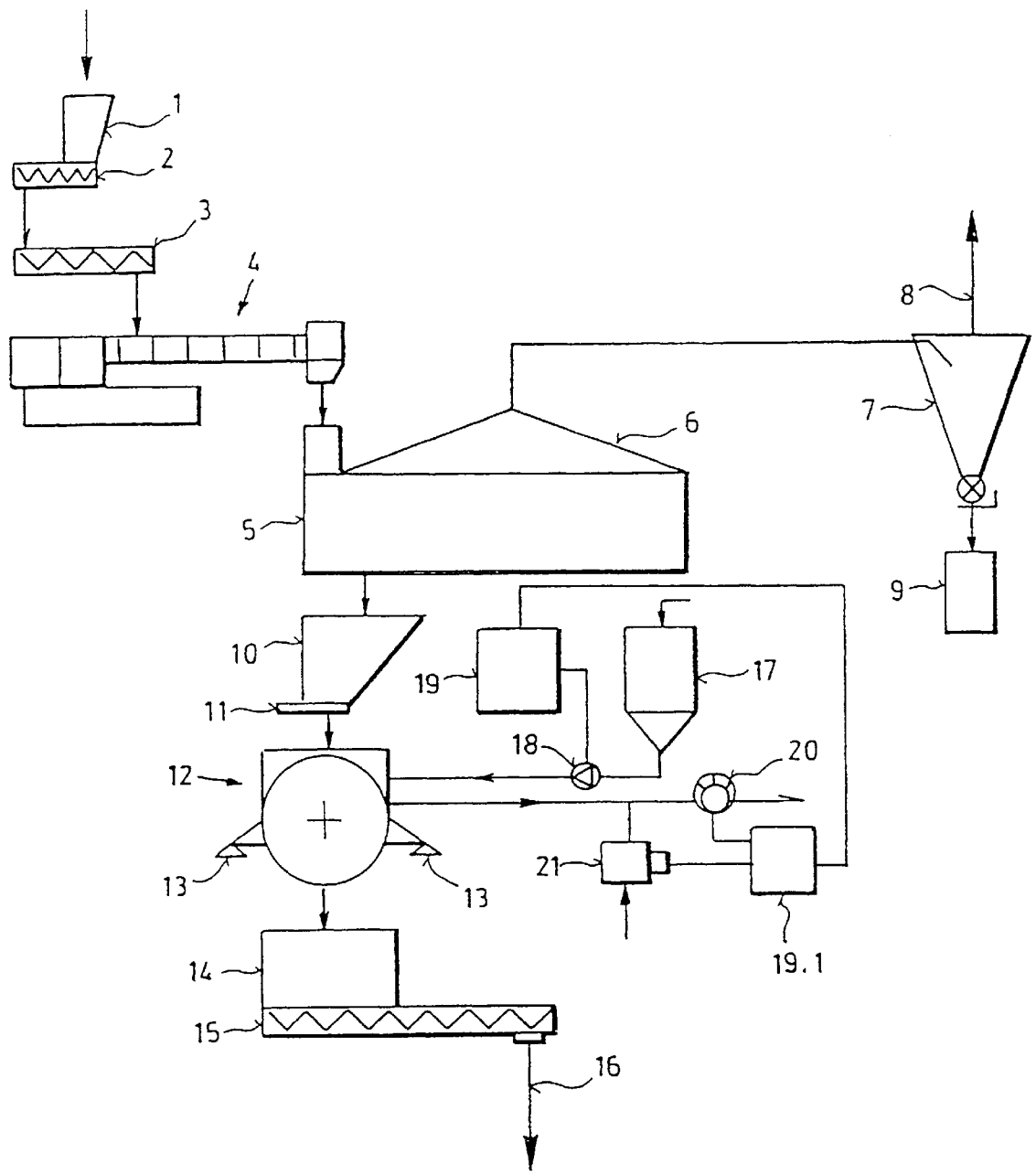

The FIGURE schematically shows equipment for producing extruded products and for the application of fat, according to the invention, to these extruded products. However, the invention is not limited to the use of such equipment but is applicable to all equipment used in the production of other porous product components such as pellets, expander pellets etc.

DETAILED DESCRIPTION OF THE PRESENT INVENTION

Shown is a filler funnel 1 which a granular or floury product reaches a dosing feed-screw 2 which conveys this product in a proportioned way to a conditioning screw 3. As is known, in this conditioning screw the floury or granular product is prepared, with respect to its humidity, temperature and consistency, for subsequent treatment in the extruder or expander which follows.

The extruder or expander is a machine which is known. It may be a double-shaft extruder of the type BI-EX made and distributed by the applicant, or an expander, such as that of the designation DFEA 220, or a press for cubiform granulate with the designation "KUBEX" also manufactured and distributed by the applicant.

The extruded or expanded product is placed into a drier, such as a belt drier, also manufactured and distributed by the applicant, in which drier the extruded products or expanded products are dried and cooled.

The outgoing air of the drier 5 is collected by an outgoing air hood 6 and conveyed to a cyclone separator 7. The clean air is released as outgoing air 8 into the atmosphere, or else conveyed to a further filter (not shown). The firm substance separated from the cyclone separator 7 is collected in a collecting container 9.

The product dried in the drier 5 reaches an intermediate container 10 which as a rule has approximately the same volume as mixer 12 so as to make it possible to work in batches with the mixer 12. A slide gate 11 is provided at the discharge end of the intermediate container 10. When the slide gate 11 is opened, it conveys the content of the intermediate container 10 to the mixer 12.

It is understood that the performance of the in-line process machines must be attuned to that of the others.

The mixer 12 is placed on weighing scales 13 so that a predefined quantity of the dried product can be placed into the mixer 12.

The weighing scales cause the slide gate 11 to close when the quantity has been reached, and also cause the respective quantity of fat-containing liquid to be added. To this effect, the product quantity in the mixer, which is measured by the weighing scales, is signalled to a control device 19.

When the pre-set quantity of dried product in the mixer is reached, the control device 19 closes the slide gate 11 and on the basis of the weight signalled by the weighing scales 13, calculates the pre-set correct quantity in percent of the fat-containing liquid which is pumped into the mixer 12 by a dosing pump 18 from a container 17 which contains the fat-containing liquid.

Simultaneously, the control device 19 starts the mixer. After a pre-set time, a control substation 19.1 of the control device 19 starts up a vacuum pump 20 to provide, during the mixing process where the product in the mixer 12 is wetted with a fat-containing liquid, a negative pressure in the mixer which contains the individual product component.

As a result of this negative pressure, the pores or the capillaries of the individual product components are evacuated; this manifests itself for example in that the air which leaves the pores or capillaries of the product, generates froth bubbles in the moisture situated at the surface of the individual product components.

After a further pre-set time, the control substation 19.1 selects a pressure relief valve 21 which is connected between the mixer 12 and the vacuum pump 20 at the connecting line from the mixer 12 to the vacuum pump 20.

In this way, the negative pressure in the mixer is released again, i.e. atmospheric air again flows via the pressure relief valve 21 into the space of the mixer 12 which contains the individual product component, resulting in the incoming air pushing or conveying the fat-containing liquid into the pores or the capillaries. This leads to an intensive application of fat to the individual product component, thus bringing about the improved result, according to the invention, of applying up to 30% or more fat in relation to the granulate, instead of approx. 13% as in the prior art.

Since during release of the negative pressure the mixing process continues, thereby continually moistening of the individual product components the air flowing into the pores resupplies resupplying not only the oil located on the surface of the individual product component, but also, causes the moistening liquid to be further absorbed while mixing.

After the process of applying fat to the product in the mixer is completed, the content of the mixer is discharged into an intermediate container 14, according to a time pre-set in the control device. From the intermediate container 14 the fat containing product is discharged by a dosing element 15 and conveyed as the finished product 16 to the next destination, such as a storage cell.

In the equipment shown, the amount of fat-containing liquid added to the mixer is determined by experience so that the product to which fat is to be applied is able to absorb it all without any fat-containing liquid remaining at the bottom of the mixer 12 when the said mixer is emptied.

The establishment of the previously mentioned negative pressure and the subsequent release of negative pressure takes place more than once.

Furthermore, the pressure relief valve can be provided as a pressure control valve so that the air coming in again flows back in a regulated way.

LEGEND

1 Filler funnel
2 Dosing feed-screw
3 Conditioning screw
4 Extruder or expander
5 Drier
6 Outgoing air hood
7 Cyclone separator
8 Outgoing air
9 Collecting container
10 Intermediate container
11 Slide gate
12 Mixer
13 Weighing scales
14 Intermediate container
15 Discharge and dosing element (belt or feed screw)
16 Final product
17 Container for fat-containing liquid
18 Dosing pump
19, 19.1 Control device
20 Vacuum pump
21 Pressure relief valve

What is claimed is:

1. A process for applying fat to a granulated product, comprising:
   combining in a container a predetermined quantity of the granulated product with a predetermined quantity of a fat-containing liquid to moisten the granulated product;
   generating a predetermined negative pressure in the container of the moistened granulated product; and
   releasing the negative pressure over a predetermined duration of time while mixing the moistened granulated product.

2. The process according to claim 1, wherein the applied fat constitutes up to 30% of the processed granulated product.

3. The process according to claim 1, wherein the applied fat constitutes at least 30% of the processed granulated product.

4. The process according to claim 1, wherein the fat-containing liquid comprises at least one of oil and liquid fat.

5. The process according to claim 1, wherein the granulated product comprises at least one of extruded products, pellets and expander pellets.

6. The process according to claim 1, wherein at least one of the combining the granulated product with the fat-containing liquid and the generating the predetermined negative pressure occurs over a predetermined duration.

7. The process according to claim 1, wherein the releasing the negative pressure occurs in more than one step.

8. The process according to claimed 1, wherein at least one of the combining the granulated product with the fat-containing liquid and the generating the predetermined negative pressure occurs in batches.

9. A device for applying fat to a granulated product by combining in a container a predetermined quantity of granulated product with a predetermined quantity of a fat-containing liquid to moisten the granulated product; generating a predetermined negative pressure in the container of the moistened granulated product; and releasing the negative pressure over a predetermined duration of time while mixing the moistened granulated product, the device comprising:
   a first dosing unit for dosing the predetermined quantity of the granulated product;
   a second dosing unit for dosing the predetermined quantity of the fat-containing liquid;
   a mixer for mixing the predetermined quantity of the granulated product with the predetermined quantity of the fat-containing liquid;
   a controllable vacuum generation unit for generating the predetermined negative pressure; and
   a valve for releasing the predetermined negative pressure over the predetermined duration of time while mixing the moistened granulated product.

10. The device according to claim 9, further comprising a control device for controlling the release of the predetermined negative pressure by the valve in a predetermined manner.

11. The device according to claim 9, wherein the mixer comprises a batch mixer.

12. The device according to claim 9, wherein the applied fat constitutes at least 13.5% of the processed granulated product.

13. The device according to claim 9, wherein the applied fat constitutes at least 30% of the processed granulated product.

14. A device for applying fat to a granulated product by combining in a container a predetermined quantity of granulated product with a predetermined quantity of a fat-containing liquid to moisten the granulated product; generating a predetermined negative pressure in the container of the moistened granulated product; and releasing the negative pressure over a predetermined duration of time while mixing the moistened granulated product, the device comprising:
   a first dosing unit for dosing the predetermined quantity of the granulated product;
   a second dosing unit for dosing the predetermined quantity of the fat-containing liquid;
   a mixer for mixing the predetermined quantity of the granulated product with the predetermined quantity of the fat-containing liquid and for processing granulated product therein;
   a controllable vacuum generation unit for generating the predetermined negative pressure; and
   a valve for releasing the predetermined negative pressure over the predetermined duration of time while mixing the moistened granulated product.

15. The device according to claim 14, further comprising a control device for controlling the release of the predetermined negative pressure by the valve in a predetermined manner.

16. The device according to claim 14, wherein the mixer comprises a batch mixer.

* * * * *